(12) United States Patent
Kato et al.

(10) Patent No.: US 6,729,777 B2
(45) Date of Patent: May 4, 2004

(54) OPTICAL FIBER SPLICING METHOD AND OPTICAL TRANSMISSION LINE

(75) Inventors: Takatoshi Kato, Yokohama (JP); Tomonori Kashiwada, Yokohama (JP); Keiichiro Fukuda, Yokohama (JP); Noriko Iwata, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 12 days.

(21) Appl. No.: 10/026,445

(22) Filed: Dec. 27, 2001

(65) Prior Publication Data

US 2002/0114594 A1 Aug. 22, 2002

(30) Foreign Application Priority Data

Dec. 28, 2000 (JP) ........................................ 2000-401815

(51) Int. Cl.[7] ............................................. G02B 6/255
(52) U.S. Cl. ........................................................ 385/96
(58) Field of Search ......................... 385/95–99; 65/385, 65/406, 407

(56) References Cited

U.S. PATENT DOCUMENTS

| | | |
|---|---|---|
| 4,954,152 A | 9/1990 | Hsu et al. |
| 6,336,749 B1 * | 1/2002 | O'Toole et al. ............... 385/96 |

FOREIGN PATENT DOCUMENTS

| | | | |
|---|---|---|---|
| EP | 0 076 186 | 6/1983 | |
| EP | 0 340 042 | 11/1989 | |
| EP | 0 749 025 | 12/1996 | |
| EP | 1 063 544 | 12/2000 | |
| EP | 1 154 296 | 11/2001 | |
| EP | 1 174 741 | 1/2002 | |
| JP | 04067130 A | * 3/1992 | .............. G02F/1/35 |
| JP | 4-118607 | 4/1992 | |
| JP | 10300970 A | * 11/1998 | ............. G02B/6/255 |
| JP | 2000098171 A | * 4/2000 | ............. G02B/6/255 |

OTHER PUBLICATIONS

Zell et al. Low–Loss Fusion Splicing of PCVD–DFSM Fibers, J. of Lightwave Technology, vol LT–5, No. 9, Sep. 1987, pp 1192–1195.*

* cited by examiner

Primary Examiner—Hemang Sanghavi
Assistant Examiner—Sarah U Song
(74) Attorney, Agent, or Firm—McDermott, Will & Emery

(57) ABSTRACT

A method of splicing optical fibers is provided to reduce the splicing loss of the first and second optical fibers having different MFDs from each other. In a pre-fusion heating step, the MFD at the adjacent end face of the optical fiber having larger MFD is enlarged by heating a portion including the adjacent end face thereof so as to diffuse a dopant. After the pre-fusion heating step, fusion-splicing of the first and the second optical fibers is performed. Thereafter, during the post-fusion heating step, the dopant is diffused by heating a portion including the fusion-spliced part between the first and the second optical fibers.

7 Claims, 5 Drawing Sheets

OPTICAL FIBER SPLICING METHOD AND OPTICAL TRANSMISSION LINE

BACKGROUND OF THE INVENTION

1. Field of the Invention

The present invention relates to a method of connecting, by fusion-splicing, two optical fibers having different mode field diameter (hereinafter, referred to as MFD) from each other, and also to an optical transmission line using the two optical fibers thus spliced together.

2. Description of the Background Art

A dispersion-compensating fiber has been used to compensate chromatic dispersion of an optical transmission line comprising optical fibers. An optical amplifier having an optical fiber whose optical waveguide region is doped with a rare earth element has been used to compensate loss in the optical transmission line. In such cases, two optical fibers having different MFD have had to be connected together. Two connecting methods have been known, namely, a method of using a connector and fusion-splicing, the latter causing small connecting loss.

To connect two optical fibers by fusion-splicing, the coating on each optical fiber is removed at the adjacent end thereof, then the adjacent end faces of the two optical fibers are butted together, and the end faces are softened and fusion-spliced by heating with an arc discharge or the like. When the MFDs of the two fibers are equal to each other at the fusion-splicing portions, the splicing loss is small. When the MFDs are different, the larger is the difference in diameters, the larger becomes the splicing loss.

An optical fiber splicing method has been disclosed in Japanese Patent Application Laid Open No. 04-118607, which is intended to reduce the splicing loss when two optical fibers having different MFDs has been fusion-spliced. Two optical fibers are referred to as a first optical fiber having a larger MFD and a second optical fiber having a smaller MFD, respectively.

According to this splicing method, the MFD of the second optical fiber is enlarged by heating a portion including the adjacent end face thereof and by diffusing a dopant therein, and then the first and second optical fibers are fusion-spliced. Thus, the difference between the MFDs of the first and the second optical fibers can be reduced at the fusion-splicing portion, thereby leading to a reduction in the splicing loss.

SUMMARY OF THE INVENTION

It is an object of the present invention to provide an optical fiber splicing method for reducing splicing loss of a first optical fiber and a second optical fiber whose MFDs are different from each other, and an optical transmission line comprising such fibers.

In order to achieve this object, a method of connecting optical fibers by fusion-splicing is provided in which a first optical fiber having a first MFD and a second optical fiber having a second MFD smaller than the first MFD are connected together by fusion-splicing. The method comprises a pre-fusion heating step of heating a portion including the adjacent end face of the first optical fiber so as to diffuse a dopant, and a fusion-splicing step of connecting the first and the second optical fibers.

In one embodiment, the method further comprises a post-fusion heating step of heating a portion including the fusion-spliced part between the first and the second optical fibers after the fusion-splicing step. The dopant may be diffused until the MFD $2W_1$ defined by Petermann I at the adjacent end face of the first optical fiber is enlarged by at least 1 μm during pre-fusion heating step. MFD $2W_1$ can be obtained by the following formula:

$$W_1^2 = \frac{2\int_0^\infty E^2(r)r^3 dr}{\int_0^\infty E^2(r)r dr},$$

where E (r) represents the distribution of the LP01 mode.

Pursuant to another aspect of the present invention, an optical transmission line is provided in which a first optical fiber having a first MFD and a second optical fiber having a second MFD smaller than the first MFD are connected together by fusion-splicing with the above-described method.

The above and further object and novel features of the invention will be more fully clarified from the following detailed description when the same is read in connection with the accompanying drawings. It is to be expressly understood, however, that the drawings are for the purpose of illustrating only and are not intended as a definition of the limits of the invention.

BRIEF DESCRIPTION OF THE DRAWING

In order to more fully understand the drawings used in the detailed description of the present invention, a brief description of each drawing is provided.

DETAILED DESCRIPTION OF THE INVENTION

Figure 1:
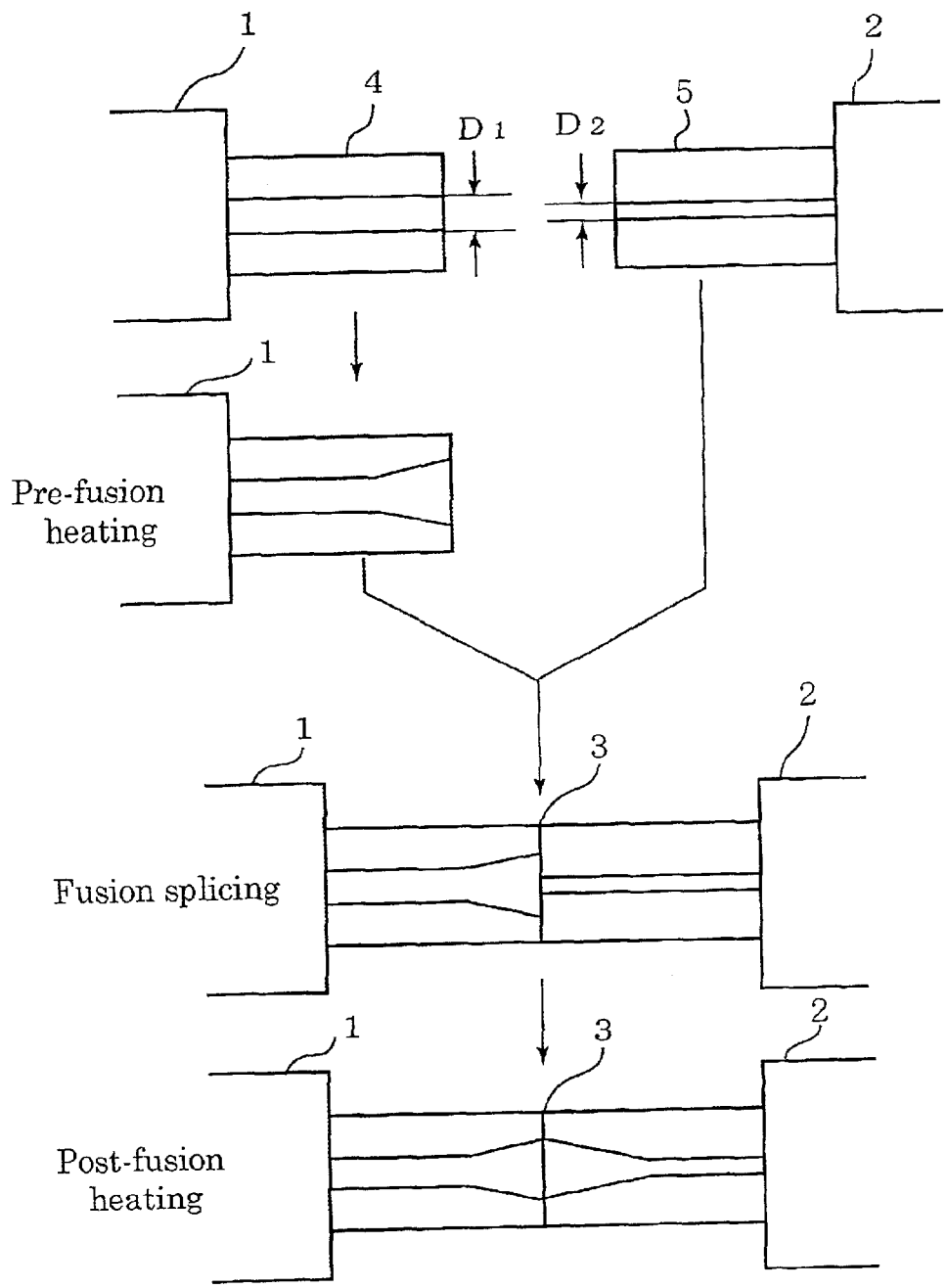
FIG. 1 is an illustration of a method of splicing optical fibers according to an embodiment of the present invention.

In the following, preferred embodiments of the present invention will be described in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of the dimensions.

Referring to FIG. 1, an embodiment of a method for splicing optical fibers according to the present invention will be described. At first, a first optical fiber (Optical Fiber 1) and a second optical fiber (Optical Fiber 2) are prepared. The MFD $D_2$ of the Optical Fiber 2 is smaller than the MFD $D_1$ of the Optical Fiber 1 in the range of operating wavelength, e.g., at the wavelength of 1.55 μm. Then, coatings of the Optical Fiber 1 and 2 are removed at the adjacent end thereof to be fusion-spliced, and a glass 4 and a glass 5 are exposed. The pair of lines drawn inside each optical fiber in the figure indicates the MFD at each position along the longitudinal direction of each optical fiber.

Optical Fiber 1 is, e.g., a typical single mode optical fiber having zero dispersion wavelength around 1.3 μm and about 17 ps/nm/km at 1.55 μm. The MFD $D_1$ is about 10 μm at the wavelength of 1.55 μm. The Optical Fiber 1 has a step index profile doped with germania ($GeO_2$) in a region including the optical axis.

On the other hand, the Optical Fiber 2 is, e.g., a dispersion-compensating optical fiber having a chromatic dispersion value ranging from about −20 to −250 ps/nm/km at the wavelength of 1.55 μm. The MFD $D_2$ is in the order of several micrometers at the wavelength of 1.55 μm.

The Optical Fiber 2 has a more complicated refractive index profile than the Optical Fiber 1. The Optical Fiber 2 is doped with an appropriate amount of, for example, $GeO_2$ or fluorine (F) in a predetermined region thereof so as to increase or decrease, respectively, the refractive index thereof.

In the pre-fusion heating step, the MFD at the adjacent end of the Optical Fiber 1, which is larger than that of the Optical Fiber 2, is enlarged by heating a portion including the adjacent end so as to diffuse the dopant ($GeO_2$ and F). The MFD at the adjacent end face of the Optical Fiber 1, as defined by Petermann I, is preferably enlarged by at least 1 μm. A burner flame, an arc discharge to be generated by a pair of opposing electrodes flanking the Optical Fiber 1, and a high-power $CO_2$ laser beam can be used as a heating source in the pre-fusion heating step. The heating temperature in this step is determined such that the dopant contained in the Optical Fiber 1 can be diffused, but this fiber itself is not softened.

A fusion-splicing step is performed after the pre-fusion heating step. In the fusion-splicing step, the Optical Fiber 1 and 2 are connected together by fusion-splicing. More specifically, the adjacent end faces of the Optical Fiber 1 and 2 are butted together, and then the portion including the adjacent end faces is heated and softened by an arc discharge generated by a pair of opposing electrodes flanking the butted end faces, thereby fusion-splicing of the two optical fibers can be performed. In the ordinary fusion-splicing step, there is little variation in the MFD of the Optical Fiber 1, substantially keeping the diameter as enlarged in the pre-fusion heating step. There is also little variation in the MFD of the Optical Fiber 2 in this fusion-splicing step.

A post-fusion heating step is performed after the fusion-splicing step. In this step, the dopant is diffused by heating a portion including the fusion-spliced part 3 between the Optical Fiber 1 and 2. The MFD at the adjacent end face of the Optical Fiber 2, having been initially small, enlarges rapidly during the post-fusion heating step, becomes larger than that of the adjacent end face of the Optical Fiber 1, reaches peak after a period of time, and subsequently becomes smaller and closer to that of the adjacent end face of the Optical Fiber 1. The MFD at the adjacent end face of the Optical Fiber 2 is accordingly adjusted so as to reduce the difference between the MFDs at the fusion-spliced part 3 of the two fibers. Thus, the splicing loss gradually decreases as the MFD at the adjacent end-face of the Optical Fiber 2 decreases as time passes. The same heating source as in the pre-fusion heating step can be used as a heating source in the post-fusion heating step. The heating temperature for this process is determined such that the dopant having been added both optical fibers can be diffused, but neither of the optical fibers are softened.

Figure 6:
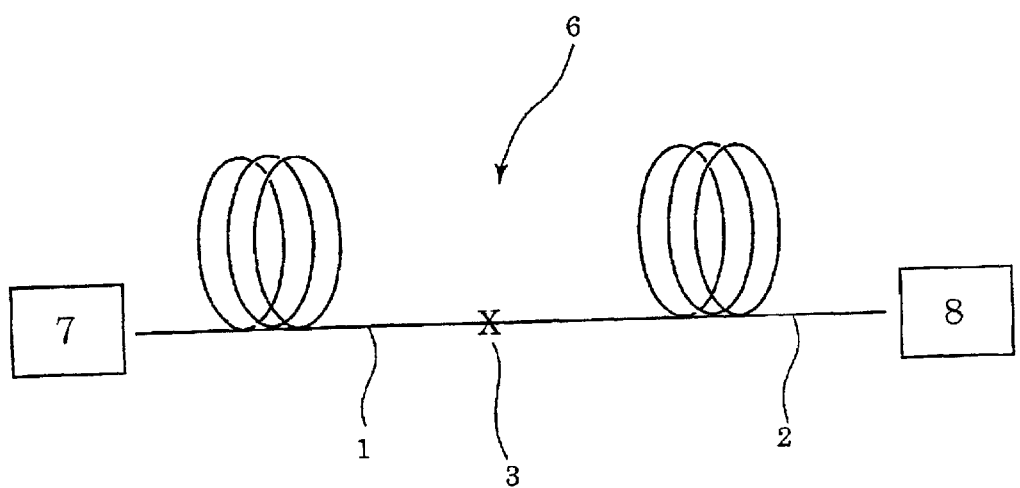
FIG. 6 shows an optical transmission line as an embodiment of the present invention.

FIG. 6 shows an optical transmission line 6 comprising Optical Fiber 1 and 2 connected together in accordance with the method as described above. The fusion splicing loss of the fusion-spliced part 3 can be reduced to 0.2 dB or less. The optical transmission line 6 is provided between a transmitter 7 and a receiver 8.

Figure 2:
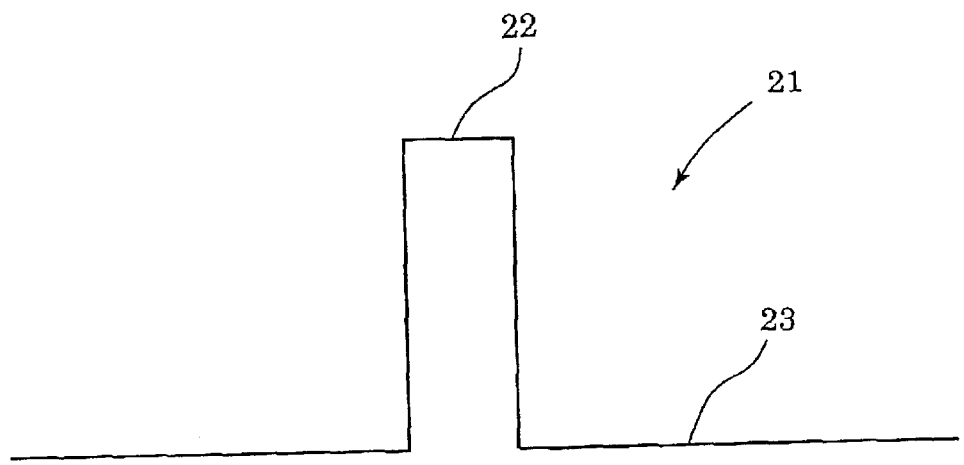
FIG. 2 is an illustration of the refractive index profile of a first optical fiber (Optical Fiber 1)

The embodiment will now be described more in detail. A single mode optical fiber 21 having the refractive index profile shown in FIG. 2 is prepared here as the Optical Fiber 1. The optical fiber 21 comprises a core region 22 having a high refractive index and including the optical axis, and a cladding region 23 having a low refractive index and surrounding the core region 22. Both regions together form a simple step index profile. The outer diameter of the core region 22 is 8.2 μm and the outer diameter of the cladding region 23, i.e., the outer diameter of the fiber is 125 μm. The relative refractive index difference of the core region 22 is 0.34% compared to that of the cladding region 23. At the wavelength of 1.55 μm, the optical fiber 21 has a chromatic dispersion of 17 ps/nm/km, a dispersion slope of 0.057 ps/nm$^2$/km, a MFD $2W_1$ of 10.7 μm defined by Petermann I, a MFD $2W_2$ of 10.3 μm defined by Petermann II, and an effective core area of 80 μm$^2$. The MFD $2W_2$ can be obtained by the following formula:

$$W_2^2 = \frac{2\int_0^\infty E^2(r)r dr}{\int_0^\infty \left(\frac{dE(r)}{dr}\right)^2 r dr},$$

where E (r) represents the distribution of the LP01 mode.

Figure 3:
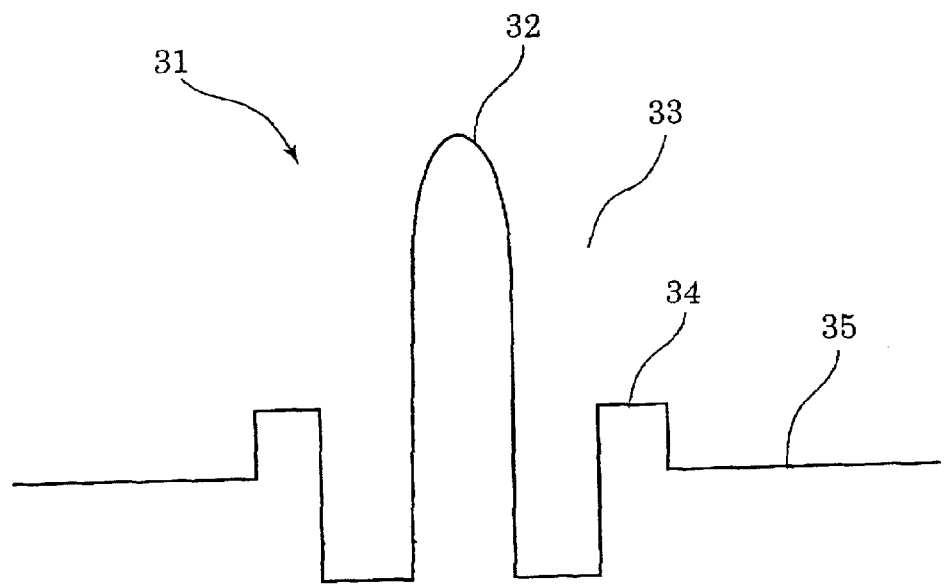
FIG. 3 is an illustration of the refractive index profile of a second optical fiber (Optical Fiber 2)

On the other hand, a dispersion compensating optical fiber 31 having the refractive index profile shown in FIG. 3 is prepared as the Optical Fiber 2. The optical fiber 31 comprises a core region 32 including the optical axis, a trench region 33 surrounding the core region 32, a ridge region 34 surrounding the trench region 33, and a cladding region 35 surrounding the ridge region 34, which together form the refractive index profile.

The outer diameters of the core region 32, the trench region 33, and the ridge region 34 are 4 μm, 10 μm, and 17 μm, respectively. The outer diameter of the cladding region 35, i.e., the outer diameter of the fiber, is 125 μm. The relative refractive index differences of the core region 32, the trench region 33, and the ridge region 34 are 1.6%, −0.5%, and 0.2%, respectively, compared to that of the cladding region 35. At the wavelength of 1.55 μm, the second optical fiber 31 has a chromatic dispersion of −96 ps/nm/km, a dispersion slope of −0.75 ps/nm$^2$/km, an MFD $2W_1$ of 7.7 μm defined by Petermann I, an MFD $2W_2$ of 4.9 μm defined by Petermann II, and an effective core area of 19 μm$^2$.

During the pre-fusion heating step in this embodiment, the MFD $2W_1$ at the adjacent end face of the optical fiber 21 is enlarged from 10.7 μm to 14.9 μm, the MFD $2W_2$ from 10.3 μm to 13.2 μm, and the effective core area from 80 μm$^2$ to 131 μm$^2$.

Figure 4A:
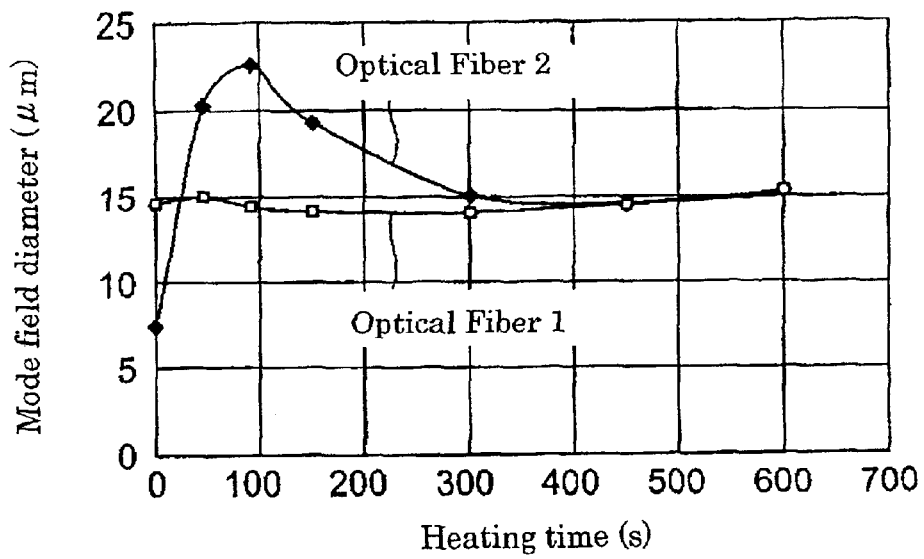
FIG. 4A is a graph showing variation of MFDs at the adjacent end faces of the Optical Fiber 1 and 2 and FIG. 4B showing a change of splicing loss, respectively, versus heating time, with the method of splicing optical fibers according to an embodiment of the present invention.
Figure 4B:
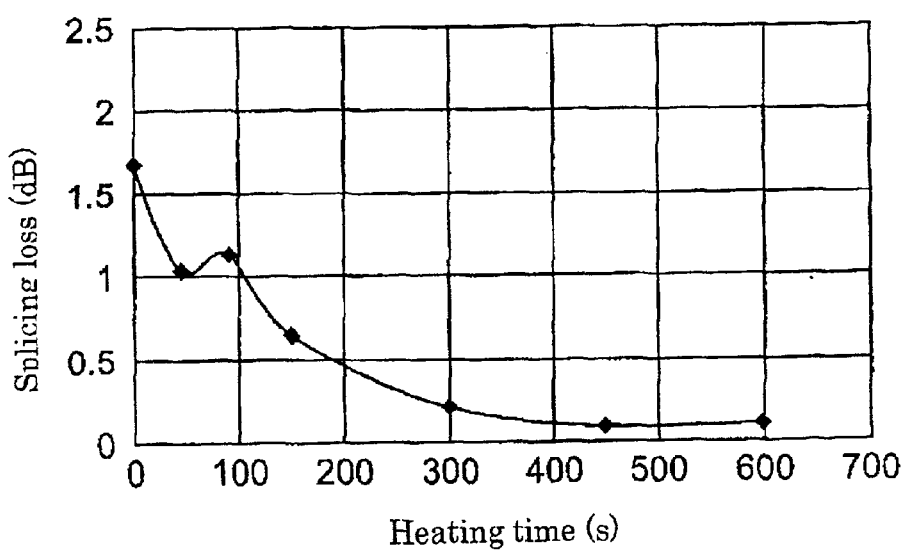

FIGS. 4A and 4B show variation of MFDs defined by Petermann I at the adjacent end faces of the Optical fiber 1 and 2 and splicing loss, respectively as heating time passes as shown in the axis of abscissas during the post-fusion heating step.

As shown in FIG. 4A, the MFD at the adjacent end face of the Optical Fiber 1 varies little as time passes, substantially keeping the diameter as enlarged during the pre-fusion heating step. On the other hand, the MFD at the adjacent end face of Optical Fiber 2, initially having been smaller, becomes rapidly larger than that at the adjacent end face of the Optical Fiber 1, reaches a peak after a period of time, and subsequently becomes smaller and closer to that at the adjacent end face of the Optical Fiber 1. As shown in FIG. 4B, as the MFD at the adjacent end face of the Optical Fiber 2 varies as time passes, the splicing loss decreases from about 1.7 dB to about 0.08 dB after 450 seconds, and thereafter remaines as low as this value.

The embodiment as above-mentioned is the case preparing the post-fusion heating step after fusion-splicing step, however, if in fusion-splicing step dopant can be diffused sufficiently so that MFD of the two fibers may become close to each other, such post-fusion heating step does not necessarily needed.

Figure 5A:
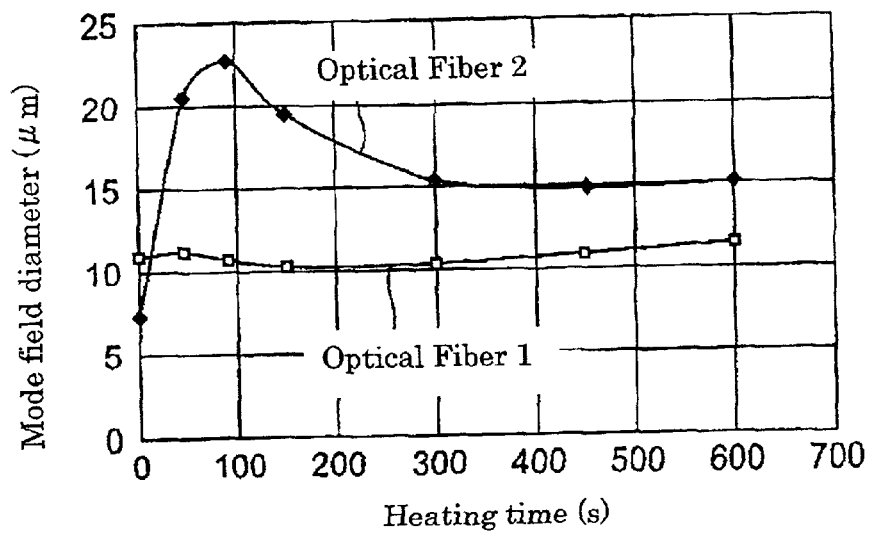
FIG. 5A is a graph showing variation of MFDs at the adjacent end faces of the Optical Fiber 1 and 2 and FIG. 5B showing a change of splicing loss, respectively, versus heating time, with the method of splicing optical fibers similar to the embodiment of the present invention, but without a pre-fusion heating step.
Figure 5B:
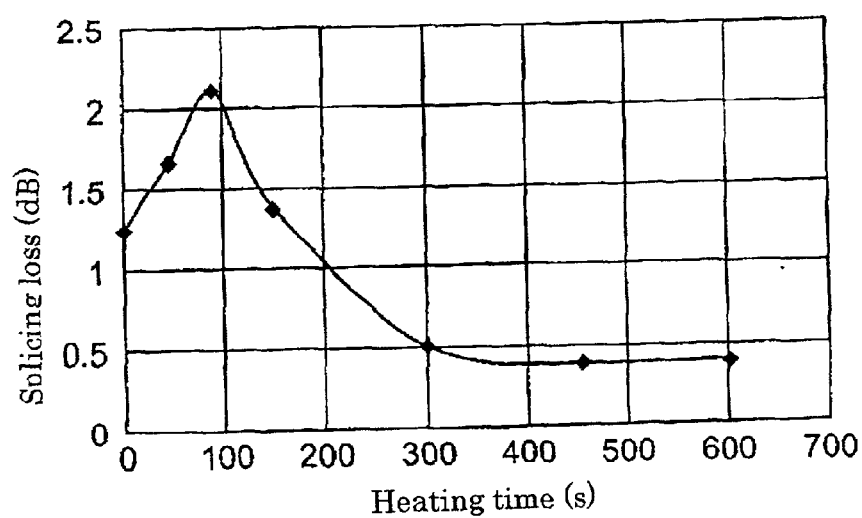

FIGS. 5A and 5B show variation of the MFDs defined by Petermann I at the adjacent end faces of the Optical Fiber 1 and 2 and the splicing loss, respectively as heating time passes with the method of splicing two optical fibers similar to the above mentioned embodiment, but without the pre-fusion heating step as shown in the axis of abscissas during the post-fusion heating step.

As shown in FIG. 5A, the MFD at the adjacent end face of the Optical Fiber 1 varies little as time passes, substantially keeping the initial diameter. On the other hand, the MFD at the adjacent end face of the Optical Fiber 2, initially having been smaller, becomes rapidly larger than that at the adjacent end face of the Optical Fiber 1, reaches a peak after a period of time, and subsequently becomes smaller. The MFD at the adjacent end face of the Optical Fiber 2, however, does not decrease to approximately same MFD at the adjacent end face of the Optical Fiber 1, and the difference between MFD of the two fibers remains about 4 $\mu$m, unlike the case of the embodiment. As shown in FIG. 5B, as the MFD at the adjacent end face of the Optical Fiber 2 varies as time passes, the splicing loss decreases from about 1.3 dB to about 0.4 dB after 450 seconds, and thereafter, does not decrease any further.

When the fusion-splicing step has been performed after enlarging MFD at the adjacent end face of the Optical Fiber 2 whose MFD is smaller than that of Optical Fiber 1, as disclosed in Japanese Patent Application Laid Open No. 04-118607, the MFDs of the two optical fibers do not become close to each other, thus resulting in failure to reduce the splicing loss, similar to the case as shown in FIG. 5A and Fig. B.

What is claimed is:

1. A method of connecting a first optical fiber having a first MFD and a second optical fiber having a second MFD smaller than the first MFD, by a fusion splicing method, comprising sequentially:

a step of heating a portion including an adjacent end face of the first optical fiber so as to diffuse a dopant; and a step of connecting the first and the second optical fibers by fusion-splicing, wherein only the first optical fiber is heated before connecting the first and second optical fibers.

2. The method of connecting optical fibers by fusion splicing according to claim 1, further comprising a step of heating a portion including the fusion-spliced part between the first and the second optical fibers so as to diffuse the dopant contained therein.

3. The method of connecting optical fibers by fusion splicing according to claim 1, wherein the MFD defined by Petermann I at the adjacent end face of the first optical fiber is enlarged by at least 1 $\mu$m by heating the portion including the adjacent end face thereof so as to diffuse the dopant during the heating step before fusion splicing.

4. A method of manufacturing an optical transmission line, including a first optical fiber having a first MFD and a second optical fiber having a second MFD smaller than the first MFD, the method comprising sequentially:

a step of heating a portion including an adjacent end face of the first optical fiber so as to diffuse a dopant; and a step of connecting the first and the second optical fibers by fusion-splicing, wherein only the first optical fiber is heated before connecting the first and second optical fibers.

5. A method of manufacturing an optical transmission line, including a first optical fiber having a first MFD and a second optical fiber having a second MFD smaller than the first MFD, the method comprising sequentially:

a step of heating a portion including an adjacent end face of the first optical fiber so as to diffuse a dopant;

a step of connecting the first and the second optical fibers by fusion-splicing; and a step of heating a portion including the fusion-spliced part between the first and the second optical fibers so as to diffuse the dopant contained therein, wherein only the first optical fiber is heated before connecting the first and second optical fibers.

6. The method according to claim 4, wherein the MFD defined by Petermann I at the fusion-spliced part of the first and the second optical fibers is at least 1 $\mu$m larger than those at the other parts thereof.

7. The method according to claim 5, wherein the MFD defined by Petermann I at the fusion-spliced part of the first and the second optical fibers is at least 1 $\mu$m larger than those at the other parts thereof.

* * * * *